United States Patent
Lee et al.

[11] 3,734,057
[45] May 22, 1973

[54] PET TOILET

[76] Inventors: Gary Lee, 1850 Aldersgate Drive, Lyndhurst, Ohio 44123; Carl Tucker, 4041 Hinsdale Road, South Euclid, Ohio 44124

[22] Filed: Sept. 1, 1971

[21] Appl. No.: 177,056

[52] U.S. Cl. ..................................... 119/1, 119/159
[51] Int. Cl. ............................................... A01k 29/00
[58] Field of Search .......................... 119/1, 159, 158

[56] References Cited

UNITED STATES PATENTS

| | | | |
|---|---|---|---|
| 3,318,285 | 5/1967 | Betham | 119/1 |
| 3,183,890 | 5/1965 | Albers | 119/159 |
| 2,204,416 | 6/1940 | Kramer | 119/1 |
| 2,883,963 | 4/1959 | Scott | 119/1 |
| 3,227,138 | 1/1966 | Campbell | 119/1 |

*Primary Examiner*—Aldrich F. Medbery
*Attorney*—Yount & Tarolli

[57] ABSTRACT

A pet toilet for receiving and then automatically flushing therefrom matter excreted by a pet. The toilet includes an enclosure having walls extending upwardly from a floor and having access means, such as an opening in a sidewall thereof, for a pet to enter and exit from the enclosure. A drainage outlet is provided in the floor and at least a portion of the upper surface of the floor is inclined downwardly toward the outlet. A flush system serves to spray water into the enclosure so that matter excreted therein by a pet is washed from the walls and floor of the enclosure so as to exit through the outlet. Water is supplied to the flush system from a suitable water source when a water supply valve is actuated. A photoelectric system serves to detect a pet entering the enclosure through the access thereto, and an electrical control responds to the photoelectric system for actuating the valve. The control circuit and photoelectric system are arranged so that the enclosure is flushed after the pet has exited. A water timer is provided for controlling the time duration that water is sprayed into the enclosure.

8 Claims, 4 Drawing Figures

PATENTED MAY 22 1973   3,734,057

INVENTORS
GARY LEE
CARL TUCKER
BY Yount and Tarolli
ATTORNEYS

PET TOILET

This invention relates to pet toilets and, more particularly, to an improved toilet which is automatically flushed after each use by a pet.

Toilets for pets, such as cats and dogs, are known and frequently take the form of a simple box having an open top. Such toilets are used for paper training young pets and by older pets during inclement weather conditions. Such toilets, however, require substantial maintenance by the pet's owner to minimize odors and fly problems. Consequently, it is desirable that such a pet toilet be provided with means for flushing the walls and floor thereof so that matter excreted by the pet may be washed away through a suitable drain. It is also desirable that the flush system work automatically so that there is no need to train the animal to actuate the system, and there is no need for the pet's owner to monitor the toilet and manually actuate the flush system.

The present invention is directed toward a pet toilet for satisfying the foregoing needs so that the walls and floor of the toilet are automatically washed after each use by a pet.

In accordance with the present invention, the toilet includes an enclosure defined by walls which extend upwardly from a floor with the walls providing an access for the pet to enter and exit from the enclosure. The floor is provided with a drainage outlet and at least a portion of the upper surface of the floor is inclined downwardly toward the outlet. Means, such as jet spray nozzles, are provided for spraying water into the enclosure in such a manner that matter excreted therein by a pet is washed from the walls and floor of the enclosure to exit therefrom through the outlet. A water supplying means such as a suitable conduit, serves to supply water from the water source to the spraying means. This supplying means includes an actuatable valve which is actuated when the toilet is to be flushed. Photoelectric means, such as a source of light and a photoelectric cell, are positioned so as to detect a pet entering the enclosure through the access thereof, and a control means serves in response to a detection by the photoelectric means for actuating the valve to thereby flush the toilet.

In accordance with a more limited aspect of the present invention, a water timer controls the time duration that water is supplied to the spraying means.

In accordance with a still further aspect of the present invention, a delay timer times a predetermined period of time, each time the photoelectric means detects a pet entering the enclosure, before actuating the valve.

In accordance with a still further aspect of the present invention, a pulse counter serves to count two pulses, one for the pet entering the enclosure and a second for the pet leaving the enclosure, and then providing an output control signal for actuating the valve.

The primary object of the present invention is to provide a pet toilet which is relatively inexpensive in construction and easy to maintain, and which serves to automatically flush excreted matter after each use.

It is a still further object of the present invention to provide a pet toilet employing photoelectric means for detecting that a pet has entered the toilet and then automatically actuating a water flush system so that matter excreted therein by the pet is washed from the walls and floor thereof.

The foregoing and other objects and advantages of the invention will become more readily apparent from the following description of the preferred embodiment of the invention taken in conjunction with the accompanying drawings which are a part hereof and wherein.

Figure 1:
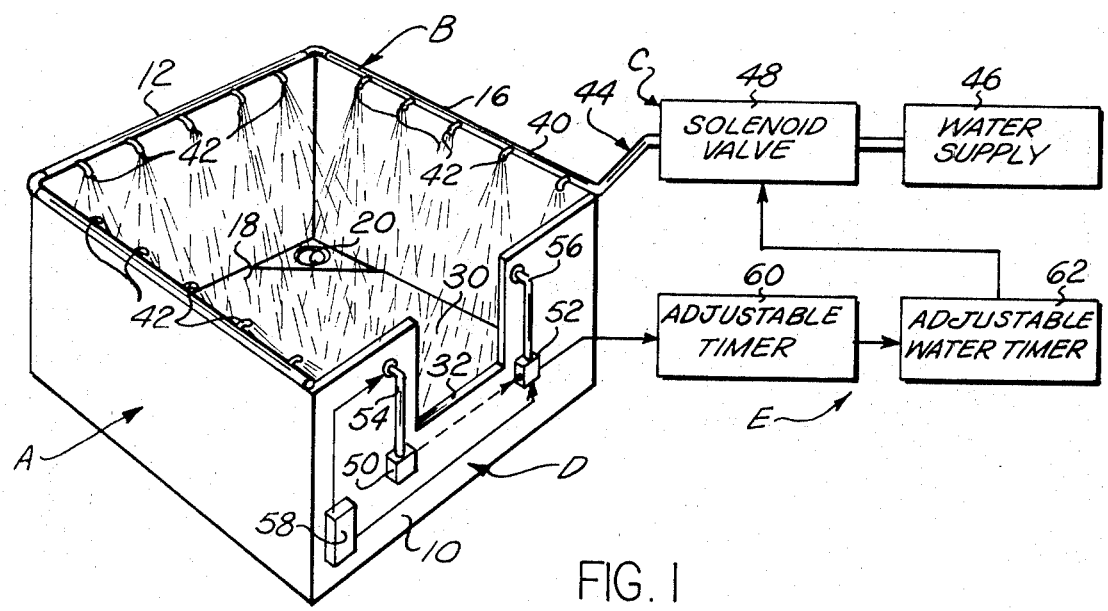
FIG. 1 is a perspective view illustrating the pet toilet constructed in accordance with the present invention.
Figure 2:
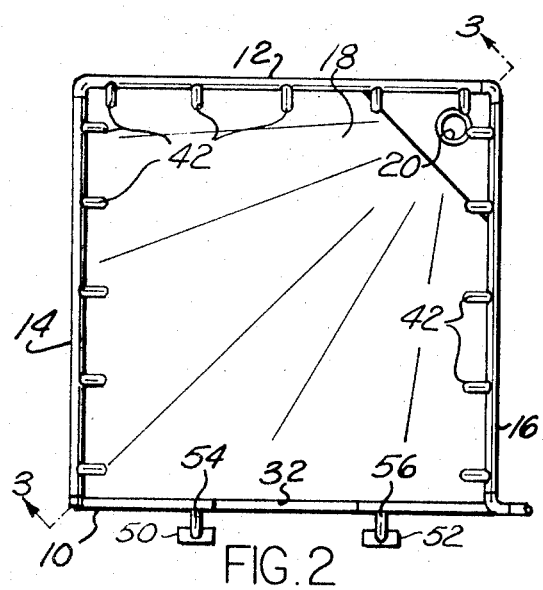
FIG. 2 is a plan view of the toilet enclosure illustrated in FIG. 1.
Figure 3:
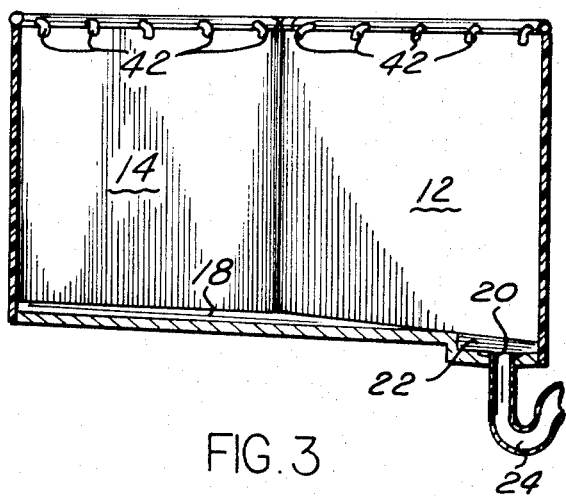
FIG. 3 is a sectional view taken along line 3—3 looking in the direction of the arrows in FIG. 2; and, FIG. 4 is a block diagram illustration of a second embodiment of the flush control system employed in the present invention.

Referring now to the drawings wherein the showings are for purposes of illustrating the preferred embodiments of the invention only and not for limiting same, FIGS. 1, 2 and 3 illustrate one embodiment of the invention. The pet toilet includes an upstanding container A, a flush system B, a water supply system C, a photoelectric animal detector D, and a water control E.

Container A may be of various configurations but preferably is a rectangular shaped, open topped container having upstanding front and rear walls 10 and 12, and upstanding sidewalls 14 and 16 extending substantially vertically upward from a floor 18. The walls 10, 12, 14 and 16 and floor 18 may be constructed of various different types of material, but preferably are constructed of fiber glass material and suitably secured to form a relatively rigid construction. Floor 18 is provided with a drain outlet 20 which is preferably located in one corner of the enclosure, although it may be located at other positions, such as in the center of the enclosure. Floor 18 is inclined downwardly toward outlet 20, as best shown in FIG. 3. If desired, floor 18 may be recessed in the corner area that includes the drain outlet 20, as shown by recess surface 22. A suitable drainpipe 24 is secured to drain outlet 20 so that excreted matter may be exited from the container.

Container B should be of a size sufficient to accommodate the pet involved. In practicing the invention, it is contemplated that the container will be provided in different sizes depending on that of the pet for which it is to be used. An access opening 30 is provided in front wall 10 as by cutting away a portion of the wall from the top downward, as best shown in FIG. 1. If desired, the access opening 30 may extend downwardly to the level of floor 18; although it is preferred that the opening extend only approximately halfway down front wall 10 requiring that the animal step over a ledge 32. This permits access for the intended pet while preventing its use by smaller animals. In addition, the raised access opening serves to ensure that matter excreted by an animal is contained within the enclosure.

The water flush system B preferably includes a pipe-like conduit 40 secured, by suitable fastening means, to the upper edge of walls 12, 14 and 16. Jet ports 42 extend from conduit 40 toward the interior of container A and are directed downwardly so that water supplied to conduit 40 is exited from jet ports 42 to wash away matter excreted by an animal on the interior surfaces of the walls as well as on the upper surface of floor 18.

The water supply system C includes a conduit 44 which may be an extension of conduit 40 and communicates therewith for supplying water from a suitable water supply 46 to the jet ports 42. A solenoid valve 48 of conventional design is interposed between water supply 46 and conduit 44 for controlling the supply of water to container A. As is conventional, valve 48 includes a solenoid coil which, when energized, serves to provide an opening through which water from supply 46 is supplied to conduits 44 and 40.

The photoelectric system D includes a conventional photoelectric light transmitter 50 and a conventional light receiver 52. The photoelectric system should be positioned so that as its light beam is broken an animal enters container B through access opening 30. Consequently, the photoelectric system may be mounted just inside or, preferably, just outside access opening 30. This is accomplished by mounting transmitter 50 and receiver 52 to the exterior side of front wall 10 as with suitable brackets 54 and 56, respectively. If desired, a power supply package 58 for the photoelectric system may also be mounted on the exterior surface of front wall 10.

The flush control E includes an adjustable delay timer 60 and an adjustable water timer 62. Timer 60 is electrically connected to photoelectric receiver 52 to be actuated thereby each time the electric eye beam is broken. The timer times a predetermined period of time, as adjusted by the user, and then actuates water timer 62. Both the delay timer 60 and the water timer 62 are conventional timers and may take the form of either electronic or electromechanical timers, as desired. The water timer 62 serves, when actuated by timer 60, to energize the solenoid coil to thereby actuate valve 48 to permit water to be supplied to conduits 40 and 44. The solenoid valve is actuated for a time period as timed by the water timer 62, and then the solenoid coil of valve 48 is deenergized.

As a pet enters access opening 30 of container B, the electric eye beam is broken to thereby provide a pulse to actuate the adjustable timer 60. This timer is preferably set for a period of time in accordance with that necessary for the animal to utilize the toilet facilities. Thereafter, timer 60 actuates the water timer 62 which then actuates the solenoid valve 48 for a predetermined period of time. This period of time is adjustable in accordance with that necessary to wash the interior walls and floor of container B of matter excreted therein by the pet. While the solenoid valve 48 is energized, water is supplied under the pressure of water supply 46 through conduits 44 and 40 and sprayed into the enclosure from jet ports 42. These jet ports are positioned and aligned so that water sprayed therefrom will wash away matter excreted on the walls and floor of the enclosure. Since floor 18 is inclined downwardly toward drain outlet 20, the excreted matter will be washed to the drain outlet and exit therethrough from the container.

Figure 4:
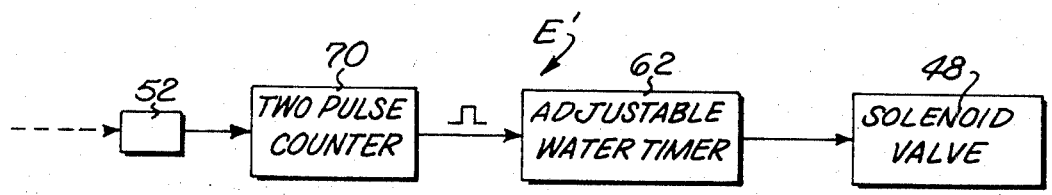

An alternative embodiment of control E is shown in FIG. 4 as control E'. This control, like that shown in FIG. 1, is connected to the photoelectric receiver 52 and includes a two pulse counter 70. Counter 70 may take various forms, such as a ratchet motor or an electric counter, and serves to count two pulses from receiver 52 and then provide an output signal for energizing the water timer 62. Thus, it requires two pulses from receiver 52 to detect that the pet has entered and then exited from the container. Adjustable timer 62, when actuated, serves to actuate the solenoid valve 48 for a predetermined period of time, as in the case of the embodiment shown in FIG. 1.

Although the invention has been shown and described in conjunction with preferred embodiments, it will be readily apparent to those skilled in the art that various changes in structure and arrangement of parts may be made without departing from the scope and spirit of the invention as defined by the appended claims.

What is claimed is:

1. A pet toilet comprising:
a floor,
means defining a walled enclosure extending upwardly from said floor and having a single access means for a pet to enter and exit from said enclosure;
said floor having a drainage outlet therein and at least a portion of the upper surface of said floor being inclined downwardly toward said outlet;
means for spraying water into said enclosure so that matter excreted therein by a said pet is washed from the walls and floor of said enclosure to said outlet;
means for supplying water to said spraying means and including actuatable valve means for, when actuated, permitting water from a water source to be supplied to said spraying means;
photoelectric means positioned for detecting a pet entering said enclosure through said single access means; and,
control means electrically controlled by said photoelectric means for actuating said valve means in response to detection of a said pet, said control means includes electrically operated water timer means for timing a predetermined time duration of actuation of said valve means to thereby control the time duration that water is supplied to said enclosure.

2. A pet toilet as set forth in claim 1, wherein said access means is defined by a single opening in a sidewall of said enclosure and wherein said photoelectric means is positioned to provide a light beam which extends across said opening in the path of entrance into said enclosure by a said pet.

3. A pet toilet as set forth in claim 2, including means for mounting said photoelectric means to said walled enclosure so that said electric beam is positioned on the exterior side of said enclosure and just forwardly of said opening so as to be in the path of entrance to said enclosure by a said pet.

4. A pet toilet as set forth in claim 1, wherein said water timing means includes means for adjusting the said predetermined time duration of actuating said valve means.

5. A pet toilet as set forth in claim 1, including delay timing means controlled by said photoelectric means for timing a predetermined delay time in response to each pet detection and then providing an output signal for actuating said water timing means and, hence, said valve means.

6. A pet toilet as set forth in claim 5, wherein said delay means includes means for adjusting said predetermined delay time.

7. A pet toilet as set forth in claim 1, wherein said photoelectric means provide a first pulse when a pet enters said enclosure and a second pulse when said pet leaves said enclosure and two pulse counting means for counting said two pulses and then providing an output signal for energizing said water timer means and, hence, actuating said valve means.

8. A pet toilet as set forth in claim 1 wherein said access means is defined by a single opening in a sidewall of said enclosure, means for mounting said photoelectric means to said walled enclosure so that the light beam provided by said photoelectric means is located on the exterior side of said enclosure and just forwardly of said opening so as to be in the path of entrance to said enclosure by a said pet, said water timing means including means for adjusting the said predetermined time duration of actuating said valve means, and delay timing means controlled by said photoelectric means for timing a predetermined delay time in response to each pet detection and then providing an output signal for actuating said water timing means and, hence, said valve means.

* * * * *